United States Patent Office 2,843,577
Patented July 15, 1958

2,843,577

PROCESS AND CATALYST FOR POLYMERIZATION USING POLYVALENT METAL SALTS AND A REDUCING AGENT PLUS A SULFUR COMPOUND

Herbert N. Friedlander, Homewood, and Omar O. Juveland and Edmund Field, Chicago, Ill., assignors to Standard Oil Company, Chicago, Ill., a corporation of Indiana No Drawing. Application October 17, 1955
Serial No. 541,038

18 Claims. (Cl. 260—94.9)

This invention relates to novel catalysts, processes for the preparation of such catalysts, and processes for the polymerization of normally gaseous n-alkenes upon contact with said novel catalysts.

Previously we discover that normally gaseous n-alkenes could be polymerized under mild polymerization conditions by contacting them with novel catalysts prepared by mixing a polyvalent metal salt of a transition metal selected from groups 4, 5, 6 and 8 of the Mendeleeff periodic table with an alkali reagent. The alkali reagents are selected from the group consisting of the alkali metals, hydrides of alkali metals, hydrocarbon derivatives of alkali metals or their mixtures.

We have now discovered that the prior process of our invention is substantially improved by the addition of a sulfur compound selected from the class consisting of mercaptans and hydrocarbon sulfides in the catalyst preparation. The term "mercaptan" is used herein in its broadest sense, namely, to denote an organic compound containing the sulfhydryl or thiol radical (—SH). The term "hydrocarbon sulfide" is defined by the general formula $R_1S_nR_2$ wherein $R_1$ and $R_2$ are monovalent hydrocarbon radicals and $n$ is a positive integer having a value of at least one, e. g., 1 to about 6 and usually 1 or 2. In polysulfides containing at least 3 sulfur atoms per molecule, some of the sulfur may be retained in the molecule as "side-chain" sulfur.

In a desirable method of operation, a dispersion of the alkali reagent, e. g. sodium, in an inert liquid hydrocarbon medium is added to a solution of the sulfur compound in hydrocarbon medium with stirring, usually at temperatures between about 20° C. and about 100° C. The ratio of sulfur compound to alkali reagent is between about 0.001 and about 1 mol per gram atom or mol of said alkali reagent. Thereafter, a polyvalent metal salt, for example, a titanium halide such as titanium chloride is added and then the normally gaseous n-alkene is contacted with the resultant catalytic products under suitable polymerization conditions in order to prepare a normally solid polymeric material.

In another desirable mode of operation, a hydrocarbon derivative of an alkali metal is prepared by reaction of a halogen derivative of a hydrocarbon, e. g. an alkyl or aryl halide, with an alkali metal in an inert liquid hydrocarbon reaction medium in the presence of a mercaptan or hydrocarbon sulfide, the polyvalent metal salt is then added and the gaseous alkene feed stock is charged to the resultant catalytic mixture and subjected to polymerization conditions to produce normally solid polymers.

Because of the enormous variety of catalyst components, the differing reactivities of the various monomers and the broad available pressure range, it is impractical to specify the precise conditions of temperature and pressure which would be preferred in each catalytic operation. Generally, however, the polymerization temperature will be selected within a range of about —40° C. to about 300° C. and polymerization pressures can be atmospheric or, preferably, superatmospheric, ranging up to 10,000 p. s. i. or even higher pressures. The weight ratio of catalyst mixture to monomer is not critical and can be varied from about 0.01 to 100 weight percent or even much more, e. g., as in flow operations, but is usually about 0.1 to about 5 weight percent.

The following examples are introduced to illustrate but not unnecessarily to limit our invention.

Example 1

A glass pressure flask was charged with 50 ml. of decalin, 0.35 g. of sodium finely-dispersed in decalin, 0.85 g. of TiCl$_4$ and 0.1 g. of n-butyl mercaptan. Ethylene was then introduced and the contents were stirred at room temperature under an ethylene pressure of 50 p. s. i. g. for 22 hours. A solid polymer of ethylene was formed in the yield of 3.41 g.

Example 2

The procedure of Example 1 was repeated, except that the amount of TiCl$_4$ was reduced to 0.43 g. and the reaction was carried out for 23 hours at 100° C. A solid polymer of ethylene was formed in the yield of 3.5 g.

The procedure of this example was repeated except that 0.6 g. of sodium dispersed in decalin and 0.85 g. of TiCl$_4$ were charged; no mercaptan was charged. Reaction was carried out at 70° C. for 6 hours. Only 0.14 g. of solid polyethylene was produced.

Example 3

In a 2-liter, 3-necked flask, fitted with an efficient stirrer, a thermometer, a gas inlet tube, and a gas outlet was placed 1 liter of CaH$_2$-dried heptane, 13.8 g. of sodium metal dispersed as a 50% dispersion in xylene, 27 g. n-butyl chloride, and 0.9 g. of n-butyl mercaptan. The reaction mixture was stirred for one-half hour at room temperature in the presence of ethylene. No ethylene absorption occurred. The temperature rose to 65° and then fell to room temperature. At this point 9.5 g. of TiCl$_4$ were added. Ethylene gas was then charged at the rate of 1 liter per minute at 3 p. s. i. g. A rapid polymerization reaction ensued, the ethylene was absorbed immediately, and the tempertaure rose to 70° C. After a period of 2 hours the temperature began to drop and the rate of ethylene absorption decreased. Addition of 1.7 g. more of TiCl$_4$ again increased the ethylene absorption rate. The reaction mixture was treated with 500 cc. methanol. The powder-like solid polyethylene reaction product was filtered, washed with aqueous methanolic HCl, followed by several aqueous methanol rinses and dried in an oven at 120° C. High density, tough polyethylene was recovered in the amount of 164 g. The solid polyethylene had a specific gravity ($d20/4°$ C.) of 0.943 g./cc. and a melt viscosity of $1.9 \times 10^9$ poises at 145° C.

Example 4

A glass pressure flask was charged with 50 ml. heptane, 0.49 g. sodium as a 50 weight percent dispersion in xylene, 0.97 g. of n-butyl chloride, 0.096 g. n-butyl mercaptan and 0.34 g. TiCl$_4$. Ethylene was introduced and the contents were stirred at room temperature under an ethylene pressure of 50 p. s. i. g. for 20 hours. During the reaction a copious amount of white, fluocculent polymer of ethylene was produced. Polymer was formed in the yield of 1.94 g. and was found to have a specific gravity ($d\ 20/4°$ C.) of 0.9742 g./cc. and a melt viscosity of $1.0 \times 10^7$ poises at 145° C.

When the procedure of the above example was repeated, with an identical charge except that the butyl mercaptan was omitted, only 0.26 g. of white, flocculent polymer was produced.

Example 5

The procedure of Example 4 was repeated, except that the following were charged: 50 g. of decalin, 0.69 g. of sodium dispersed in decalin, 1.4 g. of n-butyl chloride, 0.1 g. of n-butyl mercaptan and 0.85 g. of $TiCl_4$. Ethylene was introduced and the contents stirred at room temperature for 4 hours. A solid, white polymer of ethylene was produced in the yield of 3.8 g.

When the procedure of the above example was repeated with identical charge except that the butyl mercaptan was omitted and the reaction was continued for 5 hours, the yield of 2.71 g. of solid, white polyethylene was obtained.

Example 6

When the procedure of Example 5 was repeated except that in place of the n-butyl chloride, 2.05 g. of tertiary butyl bromide were used, and the reaction was carried out for 24 hours, 0.57 g. of solid, white polyethylene was obtained.

Example 7

When the procedure of Example 4 was repeated, except that 0.34 g. of $VCl_4$ was used instead of the $TiCl_4$, 0.73 g. of solid polyethylene was obtained.

The following examples were carried out in glass pressure flasks with ethylene at 50 p. s. i. g. for 20 hours at 25–35° C. The solid polymer work-up was effected substantially as in Example 3.

RSH, wherein R is a heterocyclic radical can also be employed, for example, 2-mercaptopyridine, 2-mercaptothiophene, 3-mercaptothiophene, 2-mercaptofuran, 2-mercaptopyrrol and the like.

We can also employ organic compounds containing a plurality of sulfhydryl groups, for example, compounds having the general formula $HS(CH_2)_nSH$, wherein $n$ is an integer between about 2 and about 12, inclusive, and the sulfhydryl groups are substituted on the terminal carbon atoms.

We can also employ mercaptocarboxylic acids such as thioglycollic acid, thiolactic acid, beta-mercaptopropionic acid, beta-mercaptovaleric acid, xanthic acids, thiol acids

thiosalicylic acid, m-mercaptobenzoic acid, and in some cases, the salts or esters of these carboxylic acids, and the like. Other mercaptans include beta-chloropropyl mercaptan, o-bromothiophenol, p-fluorothiophenol, p-chlorothiophenol, p-bromothiophenol, 2-hydroxyethyl mercaptan, 2-hydroxypropyl mercaptan, 2,3-dimercapto-1-propanol, 2-methoxyethyl mercaptan, 2-phenoxyethyl mercaptan and the like.

Because of their availability and cheapness, it is desirable to employ "sour" petroleum refinery distillates, e. g. gasoline fractions containing alkyl mercaptans, principally methyl, ethyl and propyl mercaptans. The gasoline serves as a hydrocarbon medium for the preparation of the cata-

Table
ETHYLENE POLYMERIZATION

| Example No. | Alkali Compound | | | Sulfur Compound | | | $TiCl_4$ | | Liquid Medium | Solid Polymer Yield, g. |
|---|---|---|---|---|---|---|---|---|---|---|
| | | g. | mg. atom | | g. | mmol | g. | mmol | | |
| Control | Na | 0.49 | 21.3 | none | | | 0.67 | 3.5 | Decalin | 0.18 |
| 8 | Na | 0.7 | 30.4 | n-butyl mercaptan | 0.1 | 1.1 | 0.85 | 4.48 | Heptane | 5.6 |
| 9 | Na | 0.7 | 30.4 | do | 0.01 | 0.11 | 0.85 | 4.48 | do | 0.62 |
| 10 | Na | 0.7 | 30.4 | do | 0.001 | 0.01 | 0.85 | 4.48 | do | 0.56 |
| 11 | Na | 0.35 | 15.7 | thiophenol | 0.1 | 0.91 | 0.43 | 2.27 | Decalin | 0.94 |
| 12 | Na / Cetyl Bromide | 0.49 / 3.25 | 21.3 | n-butyl mercaptan | 0.06 | 0.67 | 0.34 | 1.8 | do | 0.48 |
| 13 | Na | 0.5 | 21.7 | n-butyl disulfide | 0.06 | 0.34 | 1.03 | 5.4 | do | 1.48 |
| 14 | Na | 0.49 | 21.3 | t-butyl disulfide | 0.06 | 0.34 | 0.67 | 3.5 | do | 1.35 |
| 15 | Na | 0.49 | 21.3 | diphenyl disulfide | 0.08 | 0.37 | 0.67 | 3.5 | do | 0.74 |
| 16 | Na | 0.49 | 21.3 | dipropyl thioether | 0.08 | 0.68 | 0.67 | 3.5 | do | 0.51 |

Although the above examples have illustrated certain facets of our invention, it is capable of numerous other and varied applications.

The mercaptan can, in general, be any compound conforming to the formula RSH, wherein R is an organic radical. Because of their relative availability and cheapness, we prefer to employ mercaptans of the above general formula wherein R is a hydrocarbon radical, particularly a saturated hydrocarbon radical or an aryl radical. Illustrative examples of alkyl mercaptans (alkanethiols) which we can employ are methyl, ethyl, propyl, isopropyl, butyl, isobutyl, sec-butyl, tert-butyl, amyl, isoamyl, hexyl, heptyl, octyl, isooctyl, tert-octyl, nonyl, isononyl, decyl, dodecyl, octadecyl and similar mercaptans. We can also employ cycloalkyl mercaptans, e. g. cyclopentyl mercaptan, tert-methylcyclopentyl mercaptan, cyclohexyl mercaptan and the like. We can also employ mercaptans having the general formula RSH, wherein R is an unsaturated aliphatic radical, for example an alkenyl radical, as in allyl mercaptan, isobutenyl mercaptan or the like. Examples of aryl mercaptans (aryl thiols or arene thiols) which we can employ include thiophenol, thiocresols, o-ethylthiophenol, o-isopropylthiophenol, p-isopropylthiophenol, 1-thionaphthol, 2-thionaphthol, xenyl thiol and the like. We can also employ aralkyl mercaptans, for example, benzyl mercaptan, beta-phenylethyl mercaptan, triphenylmethyl mercaptan, and the like. Heterocyclic mercaptans having the formula lyst and for carrying out polymerization. If the desired sulfur compound is a hydrocarbon disulfide, "sweetened" petroleum refinery distillates can be employed. There are many well-known sweetening processes which convert the mercaptans in "sour" hydrocarbon oils to the corresponding disulfides. It will be understood that a large variety and a vast number of species of mercaptans can be employed for the purposes of our invention, although they are not all precise equivalents in their action.

In lieu of or in addition to the mercaptans heretofore described, we may use organic sulfides in the practice of our invention, particularly hydrocarbon sulfides. Specifically, we may employ the disulfides and higher sulfides obtainable from the mercaptans hereinbefore specified.

The hydrocarbon sulfides have the general formula $R_1S_nR_2$, wherein $R_1$ and $R_2$ are identical or different monovalent hydrocarbon radicals (or $R_1$ and $R_2$ constitute a hydrocarbon biradical) and $n$ is a positive integer of at least one, for example, 1 to about 6, and is usually 1 or 2. $R_1$ and/or $R_2$ can be saturated or unsaturated monovalent hydrocarbon radicals, for example, alkyl, cycloalkyl, aryl, alkenyl, cycloalkenyl, etc. $R_1$ and $R_2$ can be joined, e. g., as in polymethylene monosulfides, polymethylene disufides, monosulfide derivatives of olefins, etc.

Specific exampes of hydrocarbon sulfides are methyl sulfide, ethyl sulfide, vinyl sulfide, propyl sulfide, butyl sulfide, t-butyl sulfide, allyl sulfide, ethyl n-propyl sulfide;

cyclic sulfides such as tetrahydrothiophene, pentamethylene sulfide, cyclohexene sulfide and the like; phenyl methyl sulfide, phenyl propyl sulfide, 2-phenyl ethyl sulfide, phenyl sulfide, benzyl phenyl sulfide; methyl cyclohexyl sulfide or the like.

A wide variety of disulfides can be used in the practice of our invention, for example, methyl disulfide, ethyl disulfide, butyl disulfide, amyl disulfide, allyl disulfide, phenyl disulfide, cyclohexyl disulfide, methyl phenyl disulfide or the like. The corresponding trisulfides, tetrasulfides, pentasulfides, hexasulfides and the like may also be used.

Methods for the preparation of the various hydrocarbon sulfides are well known and constitute no part of the present invention.

While we prefer to add the sulfur compounds as such in the step of catalyst preparation, it will be understood that they can, in some instances, be generated in situ in the catalyst preparation zone by known means from known precursors.

Any of the alkali metals, or their mixtures with each other, or hydrides or hydrocarbon derivatives of alkali metals can be employed for the preparation of suitable polymerization catalysts. We may use alkali metal alloys, particularly Na–K liquid alloys, lead-sodium alloys, e. g., $PbNa_4$, and the like. The alkali metals are lithium, sodium, potassium, rubidium and cesium; they form hydrides having the general formula MH, wherein M represents an alkali metal. The alkali metals form a variety of hydrocarbon derivatives having the general formula MR, wherein R represents a monovalent hydrocarbon radical which may be saturated or unsaturated, for example, an alkyl, aryl, aralkyl, alkaryl, cycloalkyl, conjugated cyclodienyl, and other hydrocarbon radicals. Suitable alkyl radicals include methyl, ethyl, propyl, isopropyl, butyl, isobutyl, amyl, octyl, dodecyl, hexadecyl, octadecyl, eicosyl, and the like, for example, as in ethyl sodium, methyl lithium, butyl lithium, methyl sodium, octyl potassium. Other suitable alkali metal compounds include 5-sodio-1,3-cyclopentadiene, 9-sodio-fluorene, 1-sodio-indene, isopropyl potassium, benzyl sodium, sodium acetylides, allyl sodium, etc.

Salts of the following metals can be used in the preparation of polymer catalysts for the purposes of our invention: Ti, Zr, Hf, Th, V, Nb, Ta, U, Cr, Mo, W, Mn, Fe, Co, Ni, Ru, Rh, Pd, Os, Ir, Pt or mixtures of salts of said metals. We can employ the metal salts of various mineral acids, for example, the hydrohalogen acids; oxyhalides, e. g. titanyl chloride or vanadyl chloride and the like; salts of acids of phosphorus, sulfur, nitrogen, etc. We may also use other salts of the specified metals such as cyanides, cyanates, isocyanates, thiocyanates, isothiocyanates, azides, etc. The salts of carboxylic or sulfonic acids may also be used. Also, we may use metal derivatives, classified herein as salts, having the formula $M(OR)_n$, wherein M represents the polyvalent metal, R is an alkyl or aryl radical, and $n$ is the valence of M, for example, $Ti(OC_2H_5)_4$, $Ti(OC_3H_7)_4$, $Ti(OC_4H_9)_4$, tetra-2-ethylhexyl titanate, tetrastearyl titanate, tetraphenyl zirconate and the like, for example, the metal derivatives of the enol forms of acetylacetone, acetoacetic ester and the like.

In addition to or in lieu of the aforesaid metal salts, we may employ freshly precipitated oxides or hydroxides of said metals, which can be prepared by techniques which are well known in inorganic chemistry.

The preparation of the catalyst can be effected in the presence of various solid materials, such as carbon, silica, alumina, bauxite, fluorided alumina, synthetic or natural aluminosilicates, magnesia, titania, zirconia, powdered aluminum fluoride, sodium fluoride, sodium chloride, cryolite or the like. The added solid materials can comprise from about 10 to 200 weight percent, based on the weight of the materials which are allowed to react to form the polymerization catalysts.

The atomic or molar ratio of alkali reagent to polyvalent metal salt can be varied broadly over the range of about 1 to about 100, but is preferably about 2 to about 10. The ratio of mercaptan or hydrocarbon sulfide to alkali reagent can be varied over the range of about .001 to about 1, preferably about 0.01 to about 0.1, mol per gram atom or mol.

The proportion of liquid reaction medium in which catalyst preparation is effected can be varied within the range of about 0.5 to about 10 parts by weight or even more, based on the weight of the reactants used to prepare the catalyst.

The selected temperature of interaction between the alkali reagent and metal salt depends on the specific reagents and will generally be between about −20° C. and about 300° C., more often about 25° C. to about 70° C.

In the in situ preparation of a hydrocarbon derivative of an alkali metal by reaction of a hydrocarbon halide with alkali metal, between about 0.03 and about 1 mol of said halide can be used per gram atom of alkali metal at a suitable temperature to obtain a desirable rate of reaction, usually about 10° C. to about 75° C. In this preparation the alkali metal can first be extended on a supporting material, e. g. activated alumina, charcoal, etc. The hydrocarbon halide may be an alkyl, cycloalkyl, alkenyl or aryl halide or the like. We prefer to use hydrocarbon chlorides and bromides.

The feed stocks for polymerization are the normally gaseous n-alkenes, namely, ethylene, propylene, 1-butene and 2-butene (cis- and trans-). These alkenes may be charged to polymerization singly or in any desired mixtures with each other and/or close-boiling alkanes, e. g. as in petroleum refinery gas streams produced by thermal or catalytic cracking, dehydrogenation or the like. The polymerization feed stock may be diluted with about 0.1 to about 10 volumes of inert gas, e. g. nitrogen, argon, helium or the like.

The polymeric products produced by the processes encompassed within the scope of our invention can be subjected to a variety of treatments designed to remove all or part of the catalytic materials therefrom. Thus the polymers can be washed with methanol and with alcoholic alkalies or acids in order to deactivate and extract catalyst components. Following these treatments the polymer may be washed, in molten or soft condition, with hot water.

The normally solid polymer products can be dissolved in hot solvents, for example in aromatic hydrocarbons such as xylenes, and the resultant solutions can be treated to separate polymer having a relatively low content of material derived from the catalyst component. Thus hot aromatic hydrocarbon solutions of polymer can be subjected to the action of various hydrolytic agents to precipitate metal hydroxides which can then be separated from the remaining solution by centrifuging, decantation, filtration or other means. Alternatively, the hot aromatic hydrocarbon solution of polymer can be cooled or treated with precipitants or antisolvents such as acetone, methanol or the like to precipitate a small proportion, say up to about 5 weight percent of the solute polymer, which precipitate contains a very large proportion of the inorganic materials which were originally present in the polymer. The aromatic solvent can be recovered from the aforementioned operations and can be reused.

When very high yields of solid ethylene polymers or other solid polymers, based on the weight of catalyst, are obtained according to this invention, for example yields of at least 100 or 200 grams of solid polymer per gram of catalyst, it may not be necessary for industrial purposes to remove catalyst from the polymer since its concentration by weight therein will be 1 weight percent or even less. It will be appreciated that such a low ash content in solid polymers is, for the most uses of the polymers, an insignificant quantity which will not affect their utility or processing characteristics. The polymers of the present invention can be used or treated as the polymers whose preparation is described in U. S. Patent 2,691,647 of Edmund Field and Morris Feller, granted October 12, 1954. Stabilizers which have been found effective in preventing hydrogen chloride evolution from chlororubber, chlorinated waxes and chlorovinyl polymers may be added to the products of this invention which may contain residual halide catalyst component.

It will be understood that the various alkali reagents do not yield precisely the same results and the same is true of the various metal salts which may be employed to prepare catalysts for use in our invention. The broad variety of reagents which can be used to prepare active polymerization catalysts affords great flexibility in our invention.

Having thus described our invention, what we claim is:

1. A process for the production of a normally solid polymer which comprises contacting a normally gaseous n-alkene under polymerization conditions with a catalyst prepared by mixing a sulfur compound selected from the class consisting of mercaptans and hydrocarbon sulfides with (A) an alkali reagent selected from the class consisting of: (1) alkali metal, (2) alkali metal hydride, (3) hydrocarbon derivative of an alkali metal, and (4) mixtures of said alkali reagents, and with (B) a polyvalent metal salt of a metal selected from groups 4a, 5a, 6a and 8 of the Mendeleeff periodic table, and recovering a polymer thus produced.

2. A process for the production of a normally solid polymer which comprises contacting ethylene under polymerization conditions with a catalyst prepared by mixing a sulfur compound selected from the class consisting of mercaptans and hydrocarbon sulfides with an alkali metal and with a salt of a metal selected from groups 4a, 5a, 6a and 8 of the Mendeleeff periodic table, and recovering a normally solid hydrocarbon material thus produced.

3. The process of claim 2 wherein said sulfur compound is a mercaptan.

4. The process of claim 3 wherein said mercaptan is a hydrocarbon thiol.

5. The process of claim 4 wherein said mercaptan is an alkanethiol.

6. The process of claim 2 wherein said mercaptan is an arene thiol.

7. The process of claim 2 wherein said alkali metal is sodium, said sulfur compound is a mercaptan and said salt is a vanadium salt.

8. A process for the production of a normally solid polymer from ethylene which comprises contacting ethylene under polymerization conditions including a temperature between about 25 and about 200° C. with a catalyst prepared by mixing sodium, a sulfur compound selected from the class consisting of mercaptans and hydrocarbon sulfides and a titanium salt in the proportion of at least 1 gram atom of sodium per mol of titanium salt and between about 0.001 and about 1 mol of mercaptan per gram atom of sodium, and recovering a normally solid polymer thus produced.

9. The process of claim 8 wherein said mercaptan is n-butyl mercaptan and said titanium salt is titanium tetrachloride.

10. The process of claim 8 wherein said mercaptan is thiophenol and said titanium salt is titanium tetrachloride.

11. The process of claim 8 wherein said hydrocarbon sulfide is a butyl disulfide and said titanium salt is titanium tetrachloride.

12. The process of claim 8 wherein said hydrocarbon sulfide is phenyl disulfide and said titanium salt is titanium tetrachloride.

13. The process of claim 8 wherein said hydrocarbon sulfide is propyl thioether and said titanium salt is titanium tetrachloride.

14. A process for the production of a normally solid polymer which comprises contacting a normally gaseous n-alkene under polymerization conditions with a catalyst prepared by mixing a sulfur compound selected from the class consisting of mercaptans and hydrocarbon sulfides with an alkali metal hydride and with a salt of a metal selected from groups 4a, 5a, 6a and 8 of the Mendeleeff periodic table, and recovering a polymer thus produced.

15. A process for the production of a normally solid polymer which comprises contacting a normally gaseous n-alkene under polymerization conditions with a catalyst prepared by mixing a sulfur compound selected from the class consisting of mercaptans and hydrocarbon sulfides with a hydrocarbon derivative of an alkali metal and with a salt of a metal selected from groups 4a, 5a, 6a and 8 of the Mendeleeff periodic table, and recovering a polymer thus produced.

16. The process of claim 15 wherein said hydrocarbon derivative is an alkyl derivative and said alkene is ethylene.

17. The catalytic mixture produced by the process which comprises contacting an alkali metal and an inert liquid hydrocarbon medium with a reactive halogen derivative of a hydrocarbon in the presence of a sulfur compound selected from the class consisting of mercaptans and hydrocarbon sulfides under reaction conditions to yield a hydrocarbon derivative of said alkali metal and thereafter contacting the resultant mixture with a polyvalent metal salt of a metal selected from groups 4a, 5a, 6a and 8 of the Mendeleeff periodic table.

18. The catalytic mixture produced by contacting sodium and an inert liquid hydrocarbon reaction medium with an alkyl halide in the presence of a hydrocarbon thiol under reaction conditions to yield a hydrocarbon derivative of sodium and thereafter contacting the resultant mixture with a tetrahalide of a metal of group 4a of the Mendeleeff periodic table.

References Cited in the file of this patent

UNITED STATES PATENTS

| | | |
|---|---|---|
| 2,369,524 | Berg et al. | Feb. 13, 1945 |
| 2,439,765 | Walker et al. | Apr. 13, 1948 |
| 2,511,480 | Roedel | Jan. 13, 1950 |
| 2,728,757 | Field et al. | Dec. 27, 1955 |

FOREIGN PATENTS

| | | |
|---|---|---|
| 534,792 | Belgium | Jan. 31, 1955 |